US009678918B2

United States Patent
He et al.

(10) Patent No.: US 9,678,918 B2
(45) Date of Patent: *Jun. 13, 2017

(54) DATA PROCESSING SYSTEM AND DATA PROCESSING METHOD

(71) Applicant: HUAWEI TECHNOLOGIES CO., LTD., Shenzhen, Guangdong (CN)

(72) Inventors: Jian He, Shenzhen (CN); Guangyu Shi, Shenzhen (CN); Xiaoke Ni, Shenzhen (CN); Norbert Egi, Santa Clara, CA (US); Xiancai Li, Shenzhen (CN); Yu Liu, Shenzhen (CN); Huawei Liu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/280,700

(22) Filed: Sep. 29, 2016

(65) Prior Publication Data

US 2017/0017607 A1    Jan. 19, 2017

Related U.S. Application Data

(63) Continuation of application No. 14/567,656, filed on Dec. 11, 2014, now Pat. No. 9,459,798, which is a
(Continued)

(51) Int. Cl.
*G06F 13/12* (2006.01)
*G06F 13/38* (2006.01)
(Continued)

(52) U.S. Cl.
CPC .......... *G06F 13/4282* (2013.01); *G06F 3/061* (2013.01); *G06F 3/0611* (2013.01);
(Continued)

(58) Field of Classification Search
None
See application file for complete search history.

(56) References Cited

U.S. PATENT DOCUMENTS 6,457,121 B1 * 9/2002 Koker ................. G06F 13/4054
345/537
7,711,793 B1    5/2010 Wilson
(Continued)

FOREIGN PATENT DOCUMENTS

AU    2011370439 A1    5/2014
CN      1149736 A      5/1997
(Continued)

OTHER PUBLICATIONS

XP2520541,Pfister G F:"an introduction to the infiniband architecture", high performance mass storage and parallel. Dec. 31, 2001. total 28 pages.

*Primary Examiner* — Elias Mamo
(74) *Attorney, Agent, or Firm* — Huawei Technologies Co., Ltd.

(57) ABSTRACT

Embodiments of the present invention provide a data processing system and a data processing method. An MMIO address of a data request is obtained, where data stored in a PCIe storage device can be directly obtained from the MMIO address, and according to the MMIO address, a network adapter can directly read the data from the PCIe storage device of the data processing system, and transmit the data to a second data processing system, or directly write the data received from the second data processing system into the PCIe storage device. Therefore, the processing system can implement transmitting data directly from the PCIe storage device to the network adapter without using memory. During data transmission between the two data processing systems, a usage ratio of a resource, such as
(Continued)

memory and a CPU, is reduced, and efficiency of data transmission is improved.

16 Claims, 6 Drawing Sheets

Related U.S. Application Data continuation of application No. PCT/CN2013/086170, filed on Oct. 29, 2013.

(51) Int. Cl.
*G06F 13/42* (2006.01)
*G06F 3/06* (2006.01)
*G06F 13/10* (2006.01)
*G06F 12/10* (2016.01)
*G06F 13/28* (2006.01)
*G06F 13/40* (2006.01)

(52) U.S. Cl.
CPC .......... *G06F 3/0655* (2013.01); *G06F 3/0673* (2013.01); *G06F 12/10* (2013.01); *G06F 13/10* (2013.01); *G06F 13/28* (2013.01); *G06F 13/4022* (2013.01); *G06F 13/4221* (2013.01); *G06F 2212/1016* (2013.01)

(56) References Cited

U.S. PATENT DOCUMENTS

| | | | | |
|---|---|---|---|---|
| 7,962,715 | B2* | 6/2011 | Ware | G06F 12/0292 711/112 |
| 8,645,594 | B2* | 2/2014 | Foong | G06F 12/063 710/31 |
| 2001/0052038 | A1* | 12/2001 | Fallon | G06F 3/0613 710/68 |
| 2005/0108472 | A1* | 5/2005 | Kanai | G06F 3/0605 711/112 |
| 2008/0098197 | A1 | 4/2008 | Craddock et al. | |
| 2009/0228649 | A1* | 9/2009 | Porel | G06F 3/0605 711/114 |
| 2010/0125857 | A1 | 5/2010 | Dommeti et al. | |
| 2010/0146222 | A1* | 6/2010 | Cox | G06F 12/1081 711/154 |
| 2012/0331179 | A1 | 12/2012 | Chen | |
| 2013/0198312 | A1 | 8/2013 | Tamir et al. | |
| 2015/0095687 | A1* | 4/2015 | Spry | G06F 1/3287 713/324 |

FOREIGN PATENT DOCUMENTS

| | | |
|---|---|---|
| CN | 101751371 A | 6/2010 |
| CN | 102439983 A | 5/2012 |
| JP | 2003280825 A1 | 10/2003 |
| JP | 2010039644 A1 | 2/2010 |
| KR | 20100067067 A1 | 6/2010 |
| NO | 2005098644 A2 | 10/2005 |
| NO | 2013048477 A1 | 4/2013 |
| NO | 2013142674 A1 | 9/2013 |
| WO | 2012167531 A1 | 12/2012 |

\* cited by examiner

DATA PROCESSING SYSTEM AND DATA PROCESSING METHOD

CROSS-REFERENCE TO RELATED APPLICATIONS

This application is a continuation of U.S. patent application Ser. No. 14/567,656, filed on Dec. 11, 2014, which is a continuation of International Patent Application No. PCT/CN2013/086170, filed on Oct. 29, 2013, both of which are hereby incorporated by reference in their entireties.

TECHNICAL FIELD

The present invention relates to the field of information technologies, and in particular, to a device, a method, and a system for data transmission between different data processing systems.

BACKGROUND

In a trend of big data, a multi-duplicate manner is usually used to ensure data reliability. However, many data migration operations between nodes are usually caused when the multi-duplicate manner is used.

An RDMA (Remote Direct Memory Access) technology implements reading of data between two nodes on a network. An RDMA directly transmits data into memory of a computer through a network, and fast migrates the data from a local node to memory of a remote node without causing any influence on an operating system.

RDMA information transmitted on the network includes a destination virtual address, a memory key and the data itself. Request completion may completely be processed in user space (an arrangement is completed by using a polling user level), or is processed by using kernel memory in a case in which an application sleeps until a request is complete. By performing an RDMA operation, an application may read data from memory of a remote application or write data into the memory. A network adapter of a target host determines a memory key, and directly writes the data into an application cache.

The RDMA requires that data transmission between two servers that communicate with each other must be performed on transmitted data by using memory. If the memory is not used, data transmission cannot be performed. As a result, a delay of data transmission and a usage ratio of the memory are relatively high.

SUMMARY

Embodiments of the present invention provide a system and a data processing method, so as to improve efficiency and device utilization for data transmission between two data processing systems.

An embodiment of the present invention provides a data processing system, including a central processing unit CPU, memory, a Peripheral Component Interconnect Express PCIe controller, a network adapter, and at least one PCIe storage device, and further including:

a management unit, configured to obtain, when the data processing system receives a data request, a first storage address of requested data in the PCIe storage device according to first address information carried in the data request, where the first storage address is a memory mapping input/output MMIO address, where the network adapter directly reads data from the PCIe storage device according to the first storage address, and transmits the data to a second data processing system, or directly writes the data received from the second data processing system into the PCIe storage device, where the second data processing system is a data processing system that communicates with a first data processing system through a network.

Optionally, the PCIe storage device includes an address translating unit, configured to obtain a second storage address of the data requested by the data request in the PCIe storage device according to the first storage address.

Optionally, the second storage address is a physical address or a logical address, where the physical address is a linear continuous address in which data can be directly read, and the logical address is an address which is obtained after linear ordering is performed on a nonlinear continuous physical address.

Optionally, the address translating unit is further configured to configure a first base address register BAR, where the first BAR address register stores a correspondence between the first storage address and the second storage address, and the second storage address is a linear continuous storage address.

Optionally, the address translating unit is further configured to configure a second BAR address register, where the second BAR address register stores a correspondence between the first storage address and a virtual address of the second storage address, the second storage address is a nonlinear continuous storage address, and the virtual address of the second storage address is an address which is obtained after linear ordering is performed on the second storage address.

Optionally, the CPU assigns a unique identifier to each PCIe storage device, where the unique identifier is used to identify each PCIe storage device.

Optionally, the first address information includes the unique identifier and a logical block address LBA of the PCIe storage device.

Optionally, the management unit is further configured to establish a correspondence between the unique identifier and a base address in a BAR of the PCIe storage device.

The unique identifier includes at least one of a vender identity Vender ID, a device identity Device ID, and a hard disk serial number; or the unique identifier is an identifier which is obtained after hashing processing is performed on the at least one of the Vender ID, the Device ID, and the hard disk serial number.

Optionally, the management unit includes a base address obtaining unit and a storage address obtaining unit, where the base address obtaining unit is configured to obtain, when the data processing system receives a first data request of the second data processing system that communicates with the data processing system through the network, a base address in a BAR of the requested data according to a unique identifier that is of the PCIe storage device and is carried in the first data request; and the storage address obtaining unit is configured to obtain the first storage address of the requested data in the PCIe storage device according to the base address in the BAR and an LBA address carried in the first data request, where the first storage address is an MMIO address.

Optionally, the CPU registers the obtained first storage address in the network adapter.

Optionally, the data processing system further includes a sending unit, where the sending unit is configured to send the first storage address obtained by the management unit to the second data processing system.

Optionally, the PCIe controller obtains a data request that is sent by the network adapter and carries the first storage address, and the address translating unit obtains data of the second storage address, and returns the obtained data to the network adapter, or writes the data sent by the network adapter into the second storage address.

Optionally, the management unit further includes a global base address obtaining unit and a global storage address obtaining unit, where the global base address obtaining unit is configured to obtain, when the data processing system receives a second data request, a base address of data requested by the second data request in a BAR of the second data processing system according to a unique identifier that is of the PCIe storage device and is carried in the second data request, where the second data request is a request for sending data to the second data processing system or reading data from the second data processing system; and the global storage address obtaining unit is configured to obtain, according to the base address in the BAR of the second data processing system and an LBA address carried in the second data request, an MMIO address of the data requested by the second data request in the second data processing system.

Optionally, a data transform unit in a PCIe controller of the second data processing system obtains, according to the MMIO address of the data that is requested by the second data request sent by the data processing system in the second data processing system, a physical address or a logical address of the data requested by the second data request in the second data processing system, where the physical address is a linear continuous address in which data can be directly read, and the logical address is an address which is obtained after linear ordering is performed on a nonlinear continuous physical address.

An embodiment of the present invention provides a data processing method, where the method is applied to a data processing system including a central processing unit CPU, memory, a Peripheral Component Interconnect Express PCIe controller, a network adapter, and at least one PCIe storage device, and the method includes:

obtaining, when the data processing system receives a data request, first address information carried in the data request;

obtaining a first storage address of requested data in the PCIe storage device according to the first address information, where the first storage address is an MMIO address; and directly reading, by the network adapter, data from the PCIe storage device according to the first storage address, and transmitting the data to a second data processing system, or directly writing the data received from the second data processing system into the PCIe storage device, where the second data processing system is a data processing system that communicates with the first data processing system through a network.

Optionally, the PCIe storage device obtains a second storage address of the data requested by the data request in the PCIe storage device according to the first storage address.

Optionally, the second storage address is a physical address or a logical address, where the physical address is a linear continuous address in which data can be directly read, and the logical address is an address which is obtained after linear ordering is performed on a nonlinear continuous physical address.

Optionally, the method further includes:

configuring, by the PCIe controller, a first BAR address register, where the first BAR address register stores a correspondence between the first storage address and the second storage address, and the second storage address is a linear continuous storage address.

Optionally, the method further includes:

configuring, by the PCIe controller, a second BAR address register, where the second BAR address register stores a correspondence between the first storage address and a virtual address of the second storage address, the second storage address is a nonlinear continuous storage address, and the virtual address of the second storage address is an address which is obtained after linear ordering is performed on the second storage address.

Optionally, the CPU assigns a unique identifier to each PCIe storage device, where the unique identifier is used to identify each PCIe storage device.

Optionally, the first address information includes the unique identifier and a logical block address LBA of the PCIe storage device.

Optionally, the method further includes:

establishing a correspondence between the unique identifier and a base address in a BAR of the PCIe storage device.

Optionally, the unique identifier includes at least one of a vender identity Vender ID, a device identity Device ID, and a hard disk serial number; or the unique identifier is an identifier which is obtained after hashing processing is performed on the at least one of the Vender ID, the Device ID, and the hard disk serial number.

Optionally, the obtaining a first storage address of requested data in the PCIe storage device includes:

obtaining a base address in a BAR of the requested data according to a unique identifier that is of the PCIe storage device and is carried in the first data request; and obtaining the first storage address of the requested data in the PCIe storage device according to the base address in the BAR and an LBA address in the first data request, where the first storage address is an MMIO address.

Optionally, the CPU registers the obtained first storage address in the network adapter.

Optionally, the method further includes:

sending, by the data processing system, the obtained first storage address to the second data processing system.

Optionally, the PCIe controller obtains a data request that is sent by the network adapter and carries the first storage address, and obtains data of a second storage address, and returns the obtained data to the network adapter, or writes the data sent by the network adapter into the second storage address.

Optionally, the method further includes:

obtaining, when the data processing system receives a second data request, a base address of data requested by the second data request in a BAR of the second data processing system according to a unique identifier that is of the PCIe storage device and is carried in the second data request, where the second data request is a request for sending data to the second data processing system or reading data from the second data processing system; and obtaining, according to the base address in the BAR of the second data processing system and an LBA address carried in the second data request, an MMIO address of the data requested by the second data request in the second data processing system.

Optionally, a PCIe controller of the second data processing system obtains, according to the MMIO address of the data that is requested by the second data request sent by the data processing system in the second data processing system, a physical address or a logical address of the data requested by the second data request in the second data processing system, where the physical address is a linear continuous address in which data can be directly read, and the logical address is an address which is obtained after linear ordering is performed on a nonlinear continuous physical address.

In the data processing system and the data processing method provided by the embodiments of the present invention, an MMIO address of a data request is obtained, where data stored in a PCIe storage device can be directly obtained from the MMIO address, and according to the MMIO address, a network adapter can directly read the data from the PCIe storage device of the data processing system, and transmit the data to a second data processing system, or directly write the data received from the second data processing system into the PCIe storage device. Therefore, the processing system can implement, when performing data transmission between two data processing systems that communicate through a network, transmitting data directly from the PCIe storage device to the network adapter without using memory. During data transmission between the two data processing systems, a usage ratio of a resource, such as memory and a CPU, is reduced, and efficiency of data transmission is improved.

BRIEF DESCRIPTION OF DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly and describes the technical solutions in the embodiments of the present invention with reference to the accompanying drawings in the embodiments of the present invention. Apparently, the embodiments to be described are a part rather than all of the embodiments of the present invention. All other embodiments obtained by a person of ordinary skill in the art based on the embodiments of the present invention without creative efforts shall fall within the protection scope of the present invention.

Figure 1:
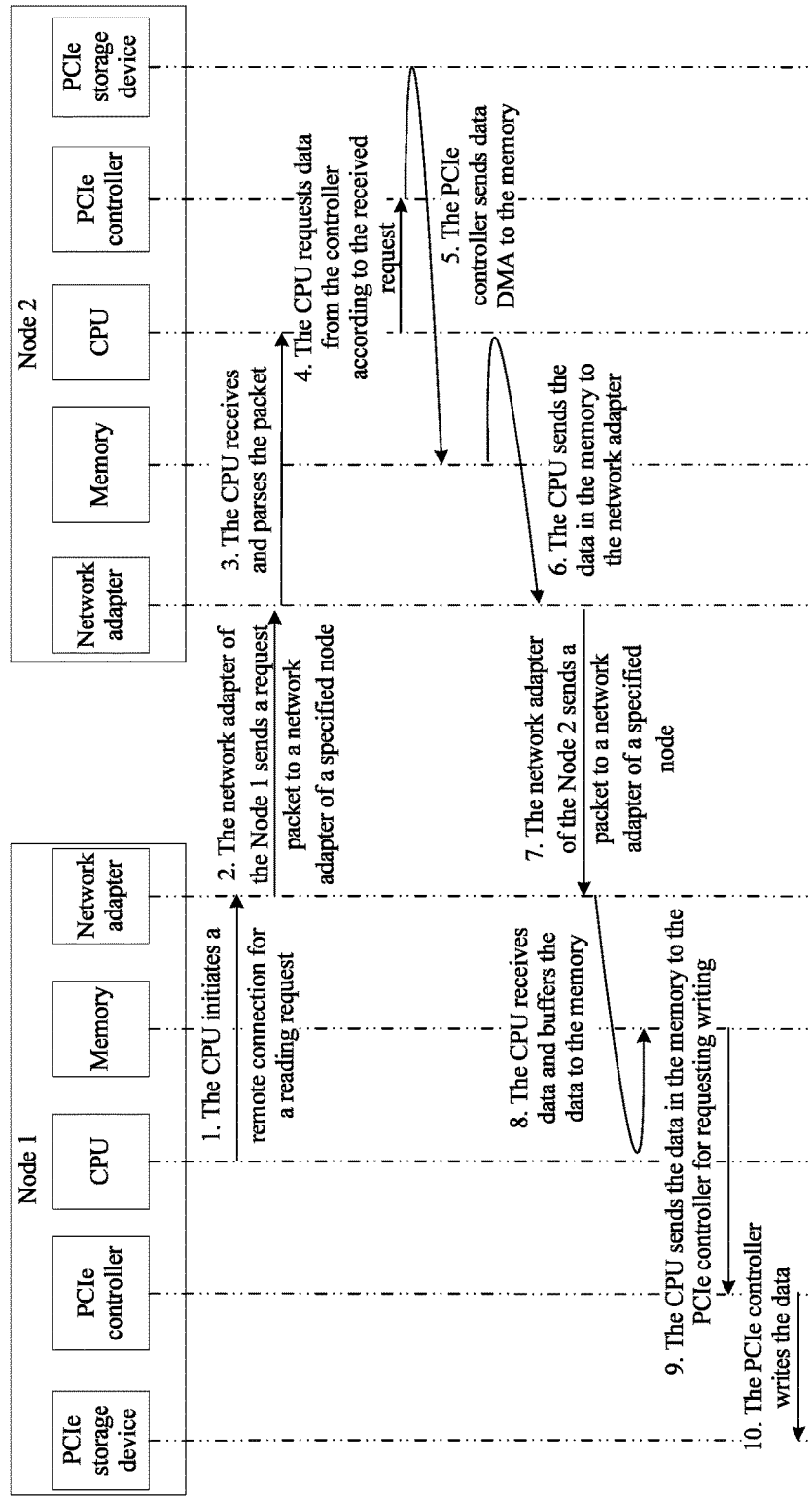
FIG. 1 is a schematic flowchart of migrating data in a remote node storage device to a local node storage device in the prior art.

FIG. 1 is a schematic flowchart of migrating data in a remote node storage device to a local node storage device in the prior art. A node may be a device which implements a computing function or a storage function, such as a server. When a Node 1 needs to read, from a node Node 2 through a network, data that is stored in a storage device of the Node 2, its implementation process is as follows:

Step 1: A CPU of the Node 1 initiates a remote connection request for reading data.

Step 2: A network adapter in the Node 1 sends a request packet to a network adapter of a specified node (that is, the Node 2).

Step 3: The network adapter of the Node 2 forwards the request packet to a CPU of the Node 2.

Step 4: The CPU of the Node 2 parses the request packet, and then initiates a data request to a PCIe controller of the CPU of the Node 2.

Step 5: The PCIe controller reads requested data to memory in a DMA manner.

Step 6: The CPU of the Node 2 sends the requested data which is read to the memory to the network adapter of the Node 2.

Step 7: The network adapter of the Node 2 sends the requested data to the network adapter of the Node 1 through a network.

Step 8: The CPU of the Node 1 reads the requested data from the network adapter of the Node 1, and then buffers the data to the memory.

Step 9: The CPU of the Node 1 sends the data buffered in the memory to the PCIe controller to request to write the data into a PCIe storage device.

Step 10: A PCIe controller of the Node 1 writes the received data into the PCIe storage device.

As may be seen from the foregoing data remote reading process in the prior art, a CPU that is involved in reading and is of a node is involved in data reading and writing, and each node needs to apply for a segment of memory space to store data that is read or is to be written by the CPU. In this case, in a whole process of data migration, because data is migrated for many times, a delay is inevitably increased, and usage ratios of the CPU and memory remain high.

In order to solve the problems of a large delay and high usage ratios of the CPU and the memory during a remote data migration in the prior art, an embodiment of the present invention provides a data processing system, so as to solve the problems of resource consumption and a delay caused by occupation of memory and CPU resources during remote data reading and writing between data processing systems in the prior art.

In order to solve the problems of occupation of many CPU and memory resources and a large transmission delay during cross-node data transmission in the prior art, an embodiment of the present invention provides a data processing system. By combining a network technology with an MMIO address mapping technology of a PCIe storage device, a data remote direct access technology between nodes is used to directly copy data. During the copying process, a CPU does not need to be involved in a data migration, and the CPU only needs to perform controlling; and at the same time, no data needs to be migrated into memory in advance for processing, so as to reduce utilization of the CPU and the memory. In addition, a migration process of data between the CPU and the memory is reduced, a delay of data processing is reduced, and efficiency of data transmission is improved.

Figure 2:
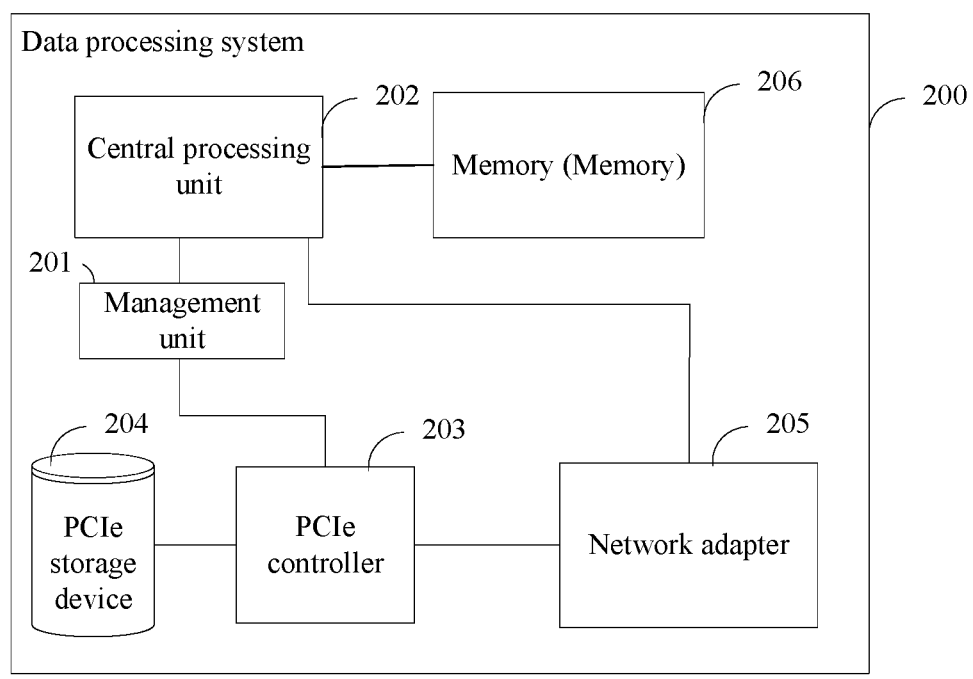
FIG. 2 is a schematic structural diagram of a data processing system according to an embodiment of the present invention.

Referring to FIG. 2, FIG. 2 is a schematic structural diagram of a data processing system 200 according to an embodiment of the present invention. The data processing system 200 includes a central processing unit CPU 202, memory 206, a Peripheral Component Interconnect Express PCIe controller 203, a network adapter 205, and at least one PCIe storage device 204, and further includes:

a management unit 201, configured to obtain, when the data processing system receives a data request, a first storage address of requested data in the PCIe storage device according to first address information carried in the data request, where the first storage address is an MMIO (Memory mapping I/O, memory mapping input/output) address, where the network adapter 205 directly reads data from the PCIe storage device 204 according to the first storage address, and transmits the data to a second data processing system, or directly writes the data received from the second data processing system into the PCIe storage device 204, where the second data processing system is a data processing system that communicates with the first data processing system through a network.

An MMIO address of a data request is obtained by a management unit 201 in the foregoing data processing system, where data stored in a PCIe storage device can be directly obtained from the MMIO address, and according to the MMIO address, a network adapter 205 can directly read the data from the PCIe storage device 204 of the data processing system 200, and transmit the data to a second data processing system, or directly write the data received from the second data processing system into the PCIe storage device 204. Therefore, the processing system can implement, when performing data transmission between two data processing systems that communicate through a network, transmitting data directly from the PCIe storage device to the network adapter without using memory. During data transmission between the two data processing systems, a usage ratio of a resource, such as memory and a CPU, is reduced, and efficiency of data transmission is improved.

Figure 3:
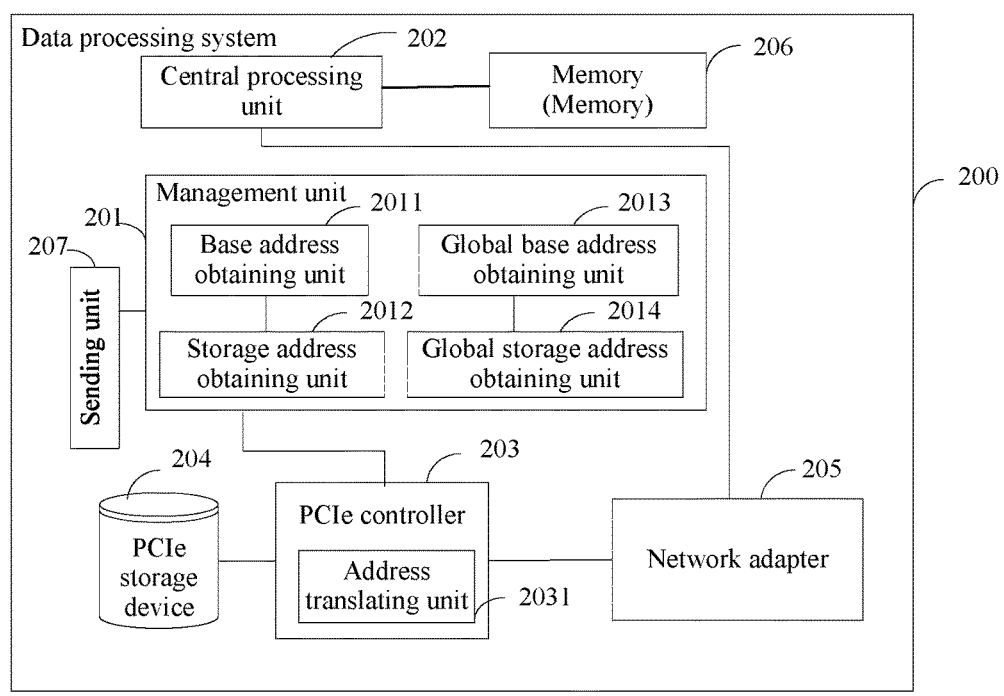
FIG. 3 is a schematic structural diagram of a specific implementation of a data processing system according to an embodiment of the present invention.

Referring to FIG. 3, FIG. 3 is a schematic structural diagram of a specific implementation of a data processing system 200 according to an embodiment of the present invention. As shown in FIG. 3, the PCIe controller 203 further includes an address translating unit 2031, configured to obtain a second storage address of the data requested by the data request in the PCIe storage device according to the first storage address. The second storage address may be a physical address or a logical address, where the physical address is a linear continuous address in which data can be directly read, and the logical address is an address which is obtained after linear ordering is performed on a nonlinear continuous physical address.

The address translating unit 2031 translates the first storage address, that is, the MMIO address, into the second storage address, where the second storage address is a physical address of an accessible medium of the PCIe storage device 204, so that when the PCIe controller 203 receives a data request of the network adapter 205, the PCIe controller 203 can obtain, according to an MMIO address carried in the data request, a physical address of an accessible medium corresponding to the MMIO address, and read data by using the physical address. In the PCIe storage device 204, when an accessible medium address is not indicated by an MMIO address, the network adapter 205 can obtain an accessible medium address of the requested data, so as to implement direct reading and writing of the data.

As an optional implementation manner, the address translating unit 2031 is further configured to configure a first base address register BAR (base address register), where the first BAR address register stores a correspondence between the first storage address and the second storage address, and the second storage address is a linear continuous storage address. If the second storage address is a nonlinear continuous storage address, the address translating unit 2031 is configured to configure a second BAR address register, where the second BAR address register stores a correspondence between the first storage address and a virtual address of the second storage address, and the virtual address of the second storage address is an address which is obtained after linear ordering is performed on the second storage address.

The foregoing address translating unit 2031 configures the BAR address register, so that, in the PCIe storage device, a linear continuous physical address is made to correspond to the MMIO address in a one-to-one manner and in the PCIe storage device, a logical address that is obtained after linear ordering is performed on a nonlinear continuous physical address is made to correspond to the MMIO address in a one-to-one manner, so as to implement mapping of the MMIO address and the accessible medium address of the PCIe storage device. Therefore, the network adapter maps, according to the MMIO address by using the PCIe controller, to a PCIe accessible storage medium address that corresponds to the MMIO address in a one-to-one manner, thereby implementing direct reading and writing of the data.

As an optional implementation manner, the CPU 202 assigns a unique identifier to each PCIe storage device, where the unique identifier is used to identify each PCIe storage device. Correspondingly, the management unit 201 is further configured to establish a correspondence between the unique identifier and a base address in a BAR of the PCIe storage device. By using the correspondence between the unique identifier of the PCIe storage device and the base address in the BAR of the PCIe storage device, the management unit 201 can obtain, according to a unique identifier that is of the PCIe storage device and is included in a data request message received by the data processing system 200, a base address that corresponds to the unique identifier and is in the BAR of the PCIe storage device. Because the first address information in the data request received by the data processing system includes the unique identifier and an LBA (Logical Block Address) address of the PCIe storage device, the management unit 201 can obtain the MMIO address of the requested data by using the obtained base address in the BAR and the LBA address of the PCIe storage device.

Optionally, the unique identifier includes at least one of a Vender ID, a Device ID, and a hard disk serial number; or the unique identifier is an identifier which is obtained after hashing processing is performed on the at least one of the Vender ID, the Device ID, and the hard disk serial number.

As an optional implementation manner, as shown in FIG. 3, the management unit 201 includes a base address obtaining unit 2011 and a storage address obtaining unit 2012, where the base address obtaining unit 2011 is configured to obtain, when the data processing system 200 receives a first data request of the second data processing system that communicates with the data processing system 200 through the network, a base address in a BAR of the requested data according to a unique identifier that is of the PCIe storage device 204 and is carried in the first data request; and the storage address obtaining unit 2012 is configured to obtain the first storage address of the requested data in the PCIe storage device according to the base address in the BAR and an LBA address in the first data request, where the first storage address is an MMIO address.

As an optional implementation manner, the CPU 202 registers the obtained first storage address in the network adapter. The first storage address is registered in the network adapter. The network adapter 205 can publish the first storage address on a PCIe bus when receiving the data request that is of the second data processing system and carries the first storage address. The PCIe controller 203 obtains the data request when receiving the request that is sent by the network adapter 205 and carries the first storage address, and sends requested data to the network adapter 205, or writes the data that is received by the network adapter and sent by the second data processing system into a position corresponding to the first storage address in the PCIe storage device.

As an optional implementation manner, the data processing system 200 further includes a sending unit 207, where the sending unit 207 is configured to send the first storage address obtained by the management unit 200 to the second data processing system.

Optionally, the PCIe controller 203 obtains the data request that is sent by the network adapter 205 and carries the first storage address, and the address translating unit 2031 obtains data of the second storage address, and returns the obtained data to the network adapter, or writes the data sent by the network adapter into the second storage address.

In the embodiment of the present invention, the data processing system 200 and another data processing system, for example, the second data processing system, communicate through a network, so as to implement data transmission between different data processing systems. The network includes but is not limited to the Ethernet, a conversion cable technology IB network that supports multiple concurrent links, an FC (fiber channel) network, or the like. The foregoing second data processing system may be a system that implements the solution of the embodiment of the present invention, and may also be a data processing system in the prior art. When the second data processing system is the system that implements the solution of the embodiment of the present invention, the second data processing system can also implement direct data reading or writing from the network adapter to the PCIe storage device.

As an optional implementation solution, the management unit 203 further includes a global base address obtaining unit 2033 and a global storage address obtaining unit 2034, where the global base address obtaining unit 2033 is configured to obtain, when the data processing system receives a second data request, a base address of data requested by the second data request in a BAR of the second data processing system according to a unique identifier that is of the PCIe storage device and is carried in the second data request, where the second data request is a request for sending data to the second data processing system or reading data from the second data processing system; and the global storage address obtaining unit 2034 is configured to obtain, according to the base address in the BAR of the second data processing system and an LBA address carried in the second data request, an MMIO address of the data requested by the second data request in the second data processing system.

Correspondingly, a data transform unit in a PCIe controller of the second data processing system obtains, according to the MMIO address of the data that is requested by the second data request sent by the data processing system in the second data processing system, a physical address or a logical address of the data requested by the second data request in the second data processing system, where the physical address is a linear continuous address in which data can be directly read, and the logical address is an address which is obtained after linear ordering is performed on a nonlinear continuous physical address.

Figure 8:
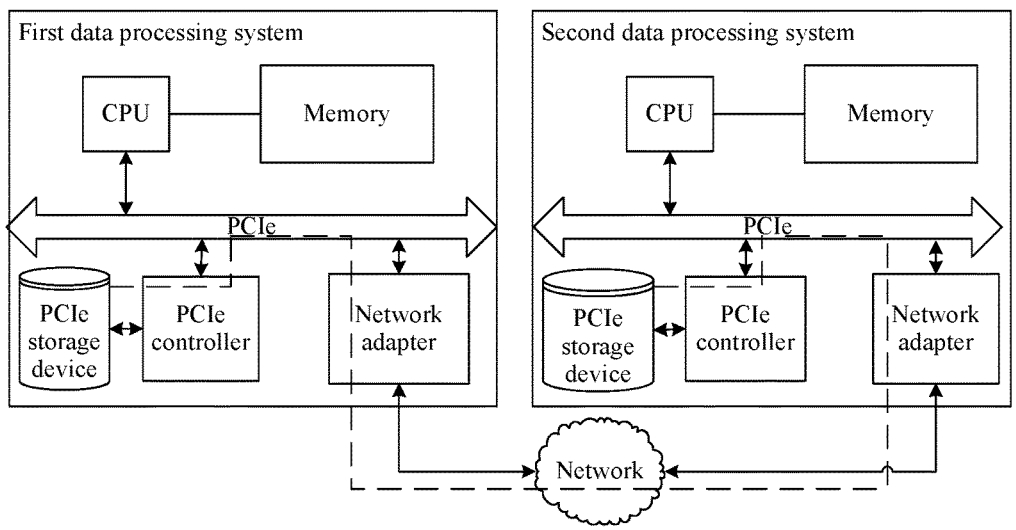
FIG. 8 is a schematic diagram of a data flow direction of data transmission between two data processing systems according to an embodiment of the present invention.

In the foregoing embodiment, the management unit 203 further stores the correspondence between the unique identifier of the PCIe storage device and the base address in the BAR of the PCIe storage device in the second data processing system, when the data processing system 200 receives the second data request for sending data to the second data processing system or reading data from the second data processing system, the data processing system 200 can obtain the base address of the data requested by the second data request in the BAR of the second data processing system, and further obtain the MMIO address of the data requested by the second data request, so as to implement direct transmission between two data processing systems without involvement of a CPU or memory, thereby saving CPU and memory resources, and improving efficiency of data transmission. For example, FIG. 8 shows that data transmission between a first data processing system and a second data processing system is implemented, where a black dashed line portion is a track and a flow direction of data transmission between the two data processing systems.

The data processing system 200 in the embodiment of the present invention may also be connected to a plurality of data processing systems through a communications network, and perform data transmission. The data processing system 200 may obtain the correspondence, which is sent by other multiple data processing systems, between the unique identifier of the PCIe storage device and the base address in the BAR of the PCIe storage device, so as to implement direct transmission between the data processing systems. The data processing system 200 may also request the correspondence between the unique identifier of the PCIe storage device and the base address in the BAR of the PCIe storage device from the other multiple data processing systems, and store the correspondence, so as to implement direct transmission between the data processing systems. Certainly, after the data processing system 200 obtains the correspondence in the other multiple data processing systems and between the unique identifier of the PCIe storage device and the base address in the BAR of the PCIe storage device, when the correspondence in the other multiple data processing systems and between the unique identifier of the PCIe storage device and the base address in the BAR of the PCIe storage device changes, a data processing system in which a change occurs may send the changed correspondence to the data processing system 200.

Figure 4:
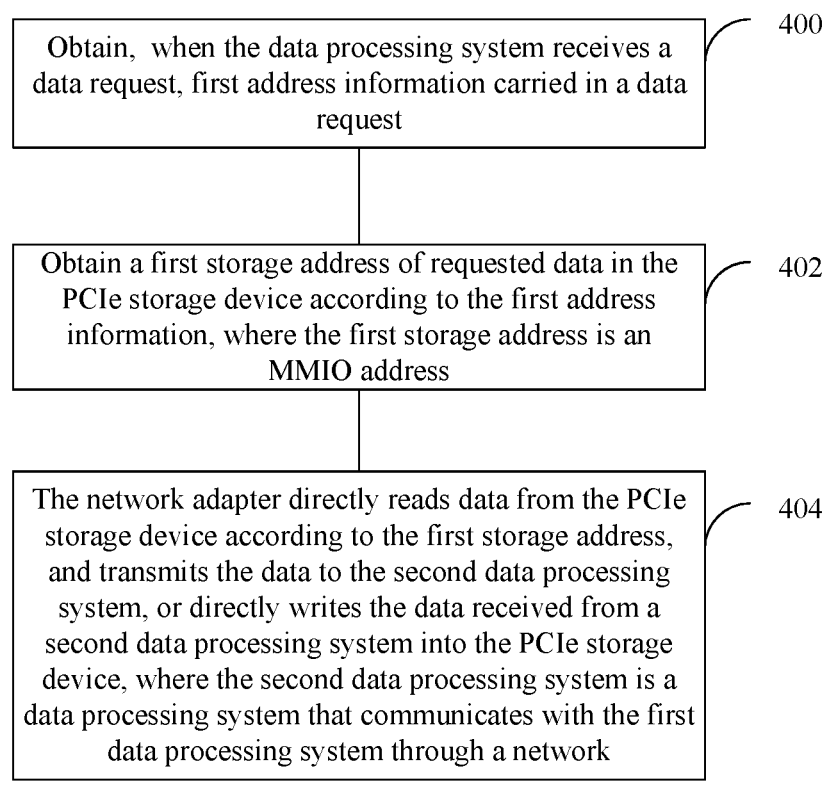
FIG. 4 is a schematic flowchart of a data processing method according to an embodiment of the present invention.

Referring to FIG. 4, FIG. 4 is a schematic flowchart of a data processing method according to an embodiment of the present invention. The data processing method in the embodiment of the present invention is applied to a data processing system including a central processing unit CPU, memory, a Peripheral Component Interconnect Express PCIe controller, a network adapter, and at least one PCIe storage device, and the method includes:

Step 400: Obtain, when the data processing system receives a data request, first address information carried in the data request.

Step 402: Obtain a first storage address of requested data in the PCIe storage device according to the first address information, where the first storage address is an MMIO address.

Step 404: The network adapter directly reads data from the PCIe storage device according to the first storage address, and transmits the data to the second data processing system, or directly writes the data received from a second data processing system into the PCIe storage device, where the second data processing system is a data processing system that communicates with the first data processing through a network.

Step 400 and step 402 in the foregoing method embodiment may be implemented by a management unit in the data processing system. The management unit may be a module or a logical unit in the CPU, and may also be a separate hardware entity in the data processing system. A specific implementation manner of the management unit is not limited in the embodiment of the present invention.

An MMIO address of a data request is obtained in step 402 in the foregoing embodiment, where data stored in a PCIe storage device can be directly obtained from the MMIO address, and according to the MMIO address, a network adapter can directly read the data from the PCIe storage device of the data processing system, and transmit the data to a second data processing system, or directly write the data received from the second data processing system into the PCIe storage device. Therefore, the processing system can implement, when performing data transmission between two data processing systems that communicate through a network, transmitting data directly from the PCIe storage device to the network adapter without using memory. During data transmission between the two data processing systems, a usage ratio of a resource, such as memory and a CPU, is reduced, and efficiency of data transmission is improved.

As an optional implementation manner, the data processing method further includes: obtaining, by the PCIe storage device, a second storage address of the data requested by the data request in the PCIe storage device according to the first storage address. The second storage address is a physical address or a logical address, where the physical address is a linear continuous address in which data can be directly read, and the logical address is an address which is obtained after linear ordering is performed on a nonlinear continuous physical address.

Optionally, the PCIe controller configures a first BAR address register, where the first BAR address register stores a correspondence between the first storage address and the second storage address, and the second storage address is a linear continuous storage address. Alternatively, the PCIe controller configures a second BAR address register, where the second BAR address register stores a correspondence between the first storage address and a virtual address of the second storage address, the second storage address is a nonlinear continuous storage address, and the virtual address of the second storage address is an address which is obtained after linear ordering is performed on the second storage address.

The BAR address register is configured, so that, in the PCIe storage device, a linear continuous physical address is made to correspond to the MMIO address in a one-to-one manner, and in the PCIe storage device, a logical address that is obtained after linear ordering is performed on a nonlinear continuous physical address is made to correspond to the MMIO address in a one-to-one manner, so as to implement mapping of the MMIO address and an accessible medium address of the PCIe storage device. Therefore, the network adapter maps, according to the MMIO address by using the PCIe controller, to a PCIe accessible storage medium address that corresponds to the MMIO address in a one-to-one manner, thereby implementing direct reading and writing of the data.

As an optional implementation manner, the data processing method further includes: assigning, by the CPU, a unique identifier to each PCIe storage device, where the unique identifier is used to identify each PCIe storage device; and establishing, according to the unique identifier, a correspondence between the unique identifier and a base address in a BAR of the PCIe storage device.

Optionally, the first address information includes the unique identifier and a logical block address LBA of the PCIe storage device.

Optionally, the unique identifier includes at least one of a Vender ID, a Device ID, and a hard disk serial number; or the unique identifier is an identifier which is obtained after hashing processing is performed on the at least one of the Vender ID, the Device ID, and the hard disk serial number.

By using the correspondence between the unique identifier of the PCIe storage device and the base address in the BAR of the PCIe storage device, according to a unique identifier that is of the PCIe storage device and is included in a data request message received by the data processing system, a base address that corresponds to the unique identifier and is in the BAR of the PCIe storage device can be obtained. Because the first address information in the data request received by the data processing system includes the unique identifier and the LBA address of the PCIe storage device, the MMIO address of the requested data can be obtained by using the obtained base address in the BAR and the LBA address of the PCIe storage device.

As an optional implementation manner, the obtaining a first storage address of requested data in the PCIe storage device includes:

obtaining a base address in a BAR of the requested data according to a unique identifier that is of the PCIe storage device and is carried in the first data request; and obtaining the first storage address of the requested data in the PCIe storage device according to the base address in the BAR and an LBA address in the first data request, where the first storage address is an MMIO address.

Optionally, the CPU registers the obtained first storage address in the network adapter. The data processing system sends the obtained first storage address to the second data processing system. When the network adapter of the data processing system receives the data request that carries the first storage address and is sent by the second data processing system, the network adapter publishes the received data request on a PCIe bus, where the request can be received by the PCIe controller in the data processing system. After the PCIe controller obtains the data request that carries the first storage address and is sent by the network adapter, the PCIe controller obtains a corresponding second storage address according to the first storage address, obtains data from the second storage address, and returns the obtained data to the network adapter, or writes the data sent by the network adapter into the second storage address.

As an optional implementation manner, the method further includes:

obtaining, when the data processing system receives a second data request, a base address of data requested by the second data request in a BAR of the second data processing system according to a unique identifier that is of the PCIe storage device and is carried in the second data request, where the second data request is used for sending data to the second data processing system or reading data from the second data processing system; and obtaining, according to the base address in the BAR of the second data processing system and an LBA address carried in the second data request, an MMIO address of the data requested by the second data request in the second data processing system.

Correspondingly, a PCIe controller of the second data processing system obtains, according to the MMIO address of the data that is requested by the second data request sent by the data processing system in the second data processing system, a physical address or a logical address of the data requested by the second data request in the second data processing system, where the physical address is a linear continuous address in which data can be directly read, and the logical address is an address which is obtained after linear ordering is performed on a nonlinear continuous physical address.

The correspondence between the unique identifier of the PCIe storage device and the base address in the BAR of the PCIe storage device in the second data processing system is obtained as described above, so that the base address of the data requested by the second data request in the BAR of the second data processing system can be obtained, and the MMIO address of the data requested by the second data request is further obtained, so as to implement direct transmission between two data processing systems without involvement of a CPU or memory, thereby saving CPU and memory resources, and improving efficiency of data transmission.

Figure 5:
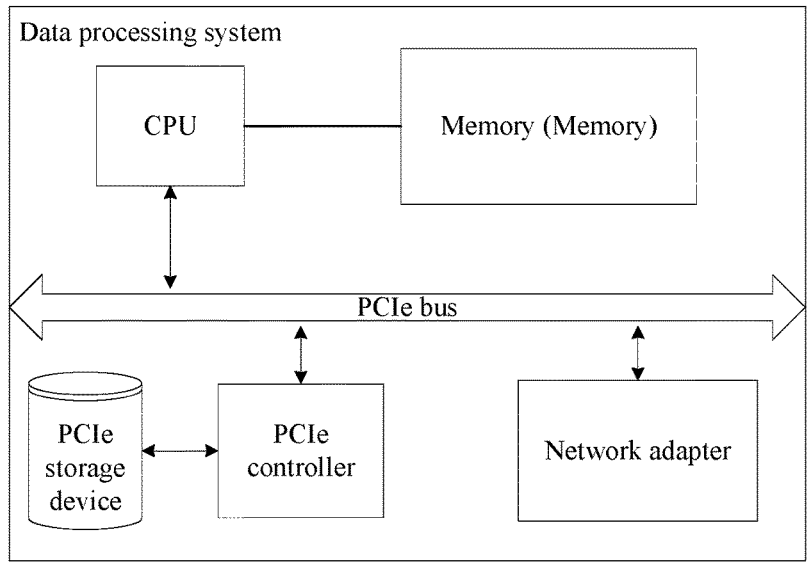
FIG. 5 is a schematic structural diagram of base hardware of an implementation manner of a data processing system according to an embodiment of the present invention.

FIG. 5 exemplarily shows a schematic structural diagram of base hardware of an implementation manner of a data processing system according to an embodiment of the present invention. The data processing system is formed by base hardware including a CPU, memory, a PCIe controller, a PCIe bus, a PCIe storage device, and a network adapter. The network adapter in the data processing system is a network adapter that supports a network direct access technology and is based on a PCIe bus technology. The network direct access technology includes but is not limited to an RDMA (Remote Direct Memory Access) technology and the like. The network adapter includes but is not limited to an Ethernet card, an IB HCA (Infiniband Host Channel Adapter, conversion cable technology host channel adapter that supports multiple concurrent links), an iWarp HCA (internet wide area RDMA protocol Host Channel Adapter), a Rapid IO HCA (Rapid IO Host Channel Adapter), and the like. That the network adapter is based on the PCIe bus technology indicates that an uplink bus interface of the network adapter is a PCIe. The data processing system further includes at least one PCIe storage device based on the PCIe bus. The PCIe storage device includes but is not limited to memory, a hard disk, an SSD (Solid State Disk), a Flash, an NVRAM (Non-Volatile Random Access Memory), and the like. An implementation manner of the data processing system includes but is not limited to a device such as a server (a rack server, a tool turret server, a shelf server, or the like), a storage device or a midrange computer.

According to the data processing system in the embodiment of the present invention, a management unit is added based on a base architecture of hardware as shown in FIG. 5. The management unit is configured to obtain, when the data processing system receives a data request, a first storage address of requested data in the PCIe storage device according to first address information carried in the data request, where the first storage address is an MMIO address. The management unit may be implemented in the CPU, and may also be implemented by using separate hardware. An implementation manner of the management unit in the data processing system is not limited in the embodiment of the present invention.

Specifically, the management unit obtains, according to an established correspondence between a base address in a BAR of the PCIe storage device and a unique identifier of the PCIe storage device, an address of data of the data request that is received by the data processing system in the PCIe storage device.

The unique identifier of the PCIe storage device, for example, a GUID (Globally Unique Identifier), is an identifier that is assigned by the data processing system for each PCIe storage device and uniquely determines the PCIe storage device. The unique identifier may be a unique identifier assigned by the CPU, and may also be a unique identifier assigned by the management unit. The unique identifier may be a unique set of character string formed by a Vender ID (vender identity) and a Device ID (device identity) of the PCIe storage device, and a unique identifier ID (for example, a hard disk serial number) of a storage device mounted in the PCIe storage device, or an identifier that is obtained after hashing is performed on the character string. Composition of the unique identifier is not limited in the embodiment of the present invention, as long as information of a storage device inside a node can be uniquely marked.

The base address in the BAR of the PCIe storage device is assigned when the data processing system starts. After the data processing system completes starting, the management unit obtains a base address in a BAR of each PCIe storage device. The management unit may obtain the base address in the BAR of each PCIe storage device and the unique identifier of the PCIe storage device by scanning all PCIe storage devices in the data processing system.

The management unit records, according to the obtained base address in the BAR of each PCIe storage device and the unique identifier of the PCIe storage device, a correspondence between the base address in the BAR of each PCIe storage device and the unique identifier of the PCIe storage device.

When the data processing system receives a data request, the data request carries a unique identifier and an LBA (Logical Block Address) address of requested data in the PCIe storage device. The management unit obtains, according to the unique identifier carried in the data request and the established correspondence between the base address in the BAR of each PCIe storage device and the unique identifier of the PCIe storage device, the base address of the requested data in the BAR of the PCIe storage device, and obtains an MMIO address of the requested data with reference to the LBA address. The management unit may obtain a start address and an end address of the MMIO address of the requested data in the following manner:

Start address=Mapped base address in BAR+(LBA×
   Block size)

End address=Mapped base address in BAR+((LBA+
   Block number)×Block size)−1

The management unit is further configured to maintain the correspondence between the base address in the BAR of the PCIe storage device and the unique identifier of the PCIe storage device, and refresh the correspondence between the base address in the BAR of the PCIe storage device and the unique identifier of the PCIe storage device when the base address in the BAR of the PCIe storage device changes. For example, the base address in the BAR of the PCIe storage device may change due to restarting of the data processing system, that is, the base address in the BAR of the PCIe storage device, which is assigned by the data processing system for each PCIe storage device, may be different from a base address that is assigned last time. The management unit needs to refresh the correspondence between the unique identifier of the PCIe storage device and the base address in the BAR of the PCIe storage device according to the unique identifier of each PCIe storage device.

Figure 6:
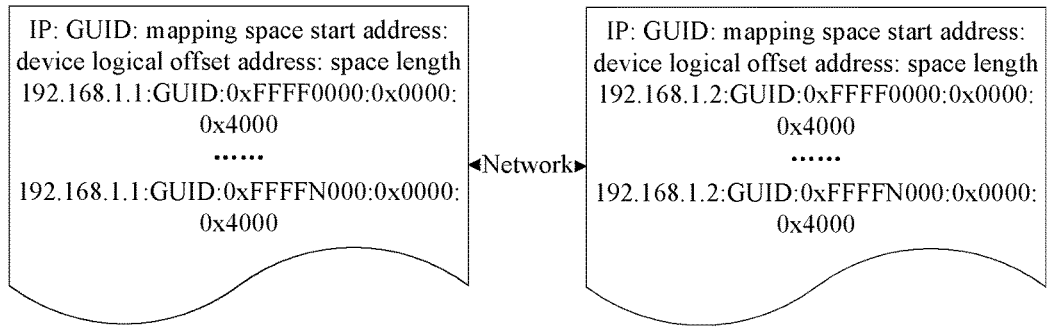
FIG. 6 is an exemplary diagram of a correspondence between a unique identifier that is of a PCIe storage device and is stored in a management unit and a base address in a BAR of the PCIe storage device according to an embodiment of the present invention.

The management unit may also obtain a correspondence between a base address in a BAR of a PCIe storage device in another data processing system and a unique identifier of the PCIe storage device. By using the correspondence between the base address in the BAR of the PCIe storage device in the another data processing system and the unique identifier of the PCIe storage device, when data reading and writing are performed on the another data processing system, a storage address of the PCIE storage device in the another data processing system can be obtained. Obtaining the correspondence between the base address in the BAR of the PCIe storage device in the another data processing system and the unique identifier of the PCIe storage device may be implemented in a manner that the data processing system actively initiates a request to the another data processing system, and may also be implemented after the correspondence actively sent by the another data processing system is received. A specific obtaining manner is not limited in the embodiment of the present invention Referring to FIG. 6, FIG. 6 is an exemplary diagram of a correspondence between a unique identifier that is of a PCIe storage device and is stored in a management unit and a base address in a BAR of the PCIe storage device according to an embodiment of the present invention. In this exemplary diagram, an IP address is used to identify a unique address of the data processing system on a network in which the data processing system is located, where a GUID is a unique identity of the PCIe storage device, a mapping space start address is a start address of a PCIe storage device address in an area mapped from CPU addressing space; a device logical address refers to a logical start address inside a PCIe storage device; and a space length refers to a whole length of the area mapped in the system.

In the embodiment of the present invention, the correspondence between the unique identifier of the PCIe storage device and the base address in the BAR of the PCIe storage device may be established by a drive of the PCIe storage device, and may also be established by the management unit. Specifically, a manner of adding a script may be used for automatic loading after the data processing system starts, and a manual manner may also be used for loading. When the correspondence is established by the drive of the PCIe storage device, first the drive of the PCIe storage device configures a PCIe BAR address register, and the management unit reads a configured mapping relationship. When the correspondence is established by the management unit, correspondence establishing is implemented by configuring a register of the PCIe storage device.

The PCIe storage device in the embodiment of the present invention further includes an address translating unit, configured to obtain a second storage address of the data requested by the data request in the PCIe storage device according to the first storage address.

The address translating unit may be implemented in a PCIe device controller. A correspondence between a medium accessible address and the MMIO address in the PCIe storage device is established, and the medium accessible address that corresponds to the MMIO address in the PCIe storage device can be obtained according to the MMIO address when a data reading and writing request for the MMIO address is received, for example, a storage address of the PCIe storage device, for performing data reading and writing.

That a PCIe NVRAM serves as the PCIe storage device is used as an example, according to a PCIe protocol specification that the PCIe NVRAM follows, address space of an accessible medium inside the PCIe NVRAM is directly mapped to MMIO address space of a CPU, so that all reading and writing requests for the PCIe NVRAM are equivalent to a request for an MMIO address. The MMIO address space corresponds to all accessible space of the NVRAM, that is, the correspondence between the medium accessible address and the MMIO address in the PCIe storage device is established. By accessing the MMIO address space, NVRAM space corresponding to the MMIO address space can be directly accessed. Directly mapping the address space of the accessible medium inside the PCIe NVRAM to the MMIO address space of the CPU can be implemented in a manner of configuring the BAR address register.

Figure 7:
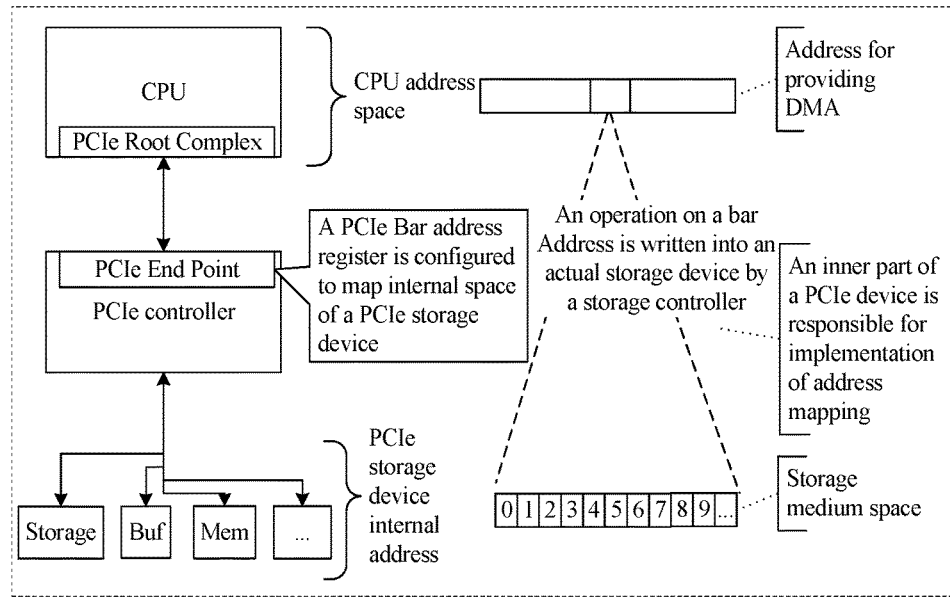
FIG. 7 is a schematic diagram of a structural relationship of mapping from an address configured in a PCIe storage device to an MMIO address of a CPU according to an embodiment of the present invention.

As shown in FIG. 7, FIG. 7 is a schematic diagram of a structural relationship of mapping from an address configured in a PCIe storage device to an MMIO address of a CPU according to an embodiment of the present invention. In the figure, a PCIe End Point in a PCIe controller is used as an address translating unit, and configures a PCIe BAR address register to map the address in the PCIe storage device to the MMIO address of the CPU, so that an access to CPU address (address for providing a DMA) space may be directly mapped to an accessible medium address of the PCIe storage device.

In the embodiment of the present invention, a correspondence between a medium accessible address in the PCIe storage device and the MMIO address is established, that is, a mapping relationship between address space of the PCIe storage device and MMIO address space in the CPU is established. Based on whether a physical address of the PCIe storage device is a linear continuous storage address, implementation manners for establishing the mapping relationship are different.

When the physical address of the PCIe storage device is a linear continuous storage address, the BAR address register configured by the address translating unit maps a segment of CPU address space with a size consistent with a size of an actual storage device. Because the address of the PCIe storage device is linear continuous, the address of the PCIe storage device corresponds to an address of the mapped CPU address space in a one-to-one manner. An operation of the CPU on this segment of address space can be obtained by the address translating unit, where the address translating unit converts a received request to an actual physical address of the PCIe storage device.

When the physical address of the PCIe storage device is not a linear continuous storage address, the address translating unit establishes mapping between a storage address that is obtained after linear ordering is performed and a CPU address. That is, a BAR address register is configured to map a segment of CPU address space with a size consistent with a size of a virtual address, where the virtual address is an address which is obtained after linear ordering is performed on a nonlinear continuous storage address. For example, a sector, a block or a unit of another minimum unit is continuously labeled to form "virtual" linear space, and is used to establish a mapping relationship with the CPU address space.

According to a correspondence that is between a base address in a BAR of the PCIe storage device and a unique identity of the PCIe storage device and is established by a management unit in the foregoing data processing system, the management unit can obtain an MMIO address of data that is requested by a data request received by the data processing system, and initiates the data request to a PCIe controller according to the MMIO address. An address translating unit in the PCIe controller obtains, according to an established correspondence between a medium accessible address in the PCIe storage device and the MMIO address, a medium accessible address of the requested data in the PCIe storage device, that is, an actual physical address. Data reading or data writing can be directly performed by using the medium accessible address.

Correspondingly, a network adapter in the data processing system can directly read data from the PCIe storage device or write data into the PCIe storage device according to the foregoing MMIO address. The problems of consumption of memory and CPU resources and a transmission delay which are caused when related data in a PCIe storage device needs to be read to physical memory, and then is transmitted to a remote data processing system by using the physical memory in the prior art are avoided.

The following describes implementation manners of the data processing system and the data processing method in the embodiments of the present invention in detail by using that a first data processing system needs to write data of 4 Kbytes of an offset address 0x1000-0x2000 of a PCIe SSD F into a position of 0x3000-0x4000 of a PCIe SSD G of a second data processing system as an example. A PCIe SSD is a specific implementation manner of a PCIe storage device. In this embodiment, that the first data processing system not only establishes a correspondence between a unique identifier of a PCIe SSD of the first data processing system and a base address in a BAR of the PCIe SSD, but also obtains a correspondence between a unique identifier of a PCIe SSD in the second data processing system and a base address in a BAR of the PCIe SSD is used as an example for description.

Step 500: The first data processing system obtains the base address in the BAR of the PCIe SSD.

The first data processing system obtains, according to a correspondence between a unique identifier of a PCIe SSD in a management unit and a base address in a BAR of the PCIe SSD, a base address 0xff00 0000 in a PCIe BAR of the PCIe SSD F, so as to obtain an MMIO address corresponding to an offset address 0x1000, for example, 0xff00 1000; and further obtain a base address 0xfe00 0000 in a PCIe BAR of the PCIe SSD G, so as to obtain an MMIO address corresponding to an offset address 0x3000-0x4000, for example, 0xfe00 3000.

Step 502: A network adapter of the first data processing system initiates a data writing request.

The network adapter of the first data processing system initiates a data request to a PCIe SSD F device by using a new MMIO address 0xff00 1000 of the PCIe SSD F, a PCIe interface inside the PCIe SSD F device converts the MMIO address into an internal accessible storage medium address XXX, where a result of the XXX may be different according to different implementations of a mapping unit. The PCIe SSD F reads data corresponding to the storage medium address XXX, and sends the data to the network adapter by using a PCIe bus after reading is complete. In this whole process, no CPU needs to be involved in a process of data transmission, and at the same time, no memory needs to be occupied.

Step 504: A network adapter of the second data processing system receives data sent by the network adapter of the first data processing system, and sends the data to the PCIe SSD G.

The network adapter of the second data processing system initiates a data writing request to a PCIe SSD G device by using a new MMIO address 0xfe00 3000 of the PCIe SSD G, a PCIe interface of the PCIe SSD G device converts the MMIO address into an internal accessible storage medium address YYY, where a result of the YYY may be different according to different implementations of the mapping unit. The PCIe SSD G writes the data sent by the network adapter into the storage medium address YYY. In this whole process, no CPU needs to be involved in a process of data transmission, and no memory needs to be occupied.

That the PCIe interface inside the PCIe SSD F device converts the MMIO address into the internal accessible storage medium address XXX, and that the PCIe interface of the PCIe SSD G device converts the MMIO address into the internal accessible storage medium address YYY are applied to a case in which a second storage address is a linear continuous physical address. When the second storage address is a logical address, that the PCIe interface inside the PCIe SSD F device converts the MMIO address into the internal accessible storage medium address XXX also needs conversion from a logical address to a nonlinear continuous address, which is not repeatedly described herein.

For a case in which the first data processing system does not obtain the correspondence between the unique identifier of the PCIe SSD and the base address in the BAR of the PCIe SSD in the second data processing system, a management unit of the second data processing system establishes the correspondence between the unique identifier of the PCIe SSD and the base address in the BAR of the PCIe SSD in the second data processing system, when the network adapter of the second data processing system receives data reading and writing requests sent by the first data processing system, obtains, according to the correspondence between the unique identifier of the PCIe SSD and the base address in the BAR of the PCIe SSD in the second data processing system, a base address in which data needs to be written and in the BAR of the PCIe SSD, and directly writes the data into the corresponding PCIe SSD.

In the foregoing embodiment of the present invention, a PCIe storage device is used as an example to describe an implementation manner for directly reading or writing data during data transmission between different data processing systems. For a storage device passing through a memory interface, for example, an SCM (Storage Class Memory), an RRAM (Resistive Random Access Memory), or an NVDIMM (Non-Volatile DIMMs), reference may also be made to an implementation manner of the foregoing PCIe storage device, and a management unit is used to perform direct reading and writing processing of data on the SCM, the RRAM, and the NVDIMM. When a system starts, during initialization, a storage device (NVDIMM\RRAM\SCM) may register space accessed by the storage device in the system. By accessing a registered address, the storage device can be accessed. Different from the foregoing embodiment, there is no need to perform mapping between an accessible medium address and an MMIO address in the PCIe storage device, and there is also no need to perform address translation, but in order to allow another data processing system on a network to obtain an address of to-be-accessed data, an address of the storage device (NVDIMM\RRAM\SCM) in the system needs to obtained, and the another data processing system needs to be synchronized.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The computer software product is stored in a storage medium and includes several instructions for instructing a computer device (which may be a personal computer, a server, a network device, or the like) to perform all or a part of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific embodiments of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A data processing system, comprising a central processing unit (CPU), a memory, a Peripheral Component Interconnect Express (PCIe) controller, a network adapter, and at least one PCIe storage device, and further comprising:
   a management unit, configured to obtain, when the data processing system receives a data request, a first storage address of requested data in the at least one PCIe storage device according to first address information carried in the data request, wherein the first storage address is a memory mapping input/output (MMIO) address, wherein
   the network adapter directly reads data from the at least one PCIe storage device according to the first storage address, and transmits the data to a separate data processing system, or directly writes the data received from the separate data processing system into the at least one PCIe storage device according to the first storage address, wherein the separate data processing system communicates with the data processing system through a network;
   wherein the PCIe controller comprises an address translating unit, configured to obtain a second storage address of the data requested by the data request in the at least one PCIe storage device according to the first storage address; the second storage address is a logical address, wherein the logical address is an address which is obtained after linear ordering is performed on a nonlinear continuous physical address.

2. The data processing system according to claim 1, wherein
   the address translating unit is further configured to configure a first Base Address Register (BAR) address register, wherein the first BAR address register stores a correspondence between the first storage address and the second storage address, and the second storage address is a linear continuous storage address.

3. The data processing system according to claim 1, wherein
   the address translating unit is further configured to configure a second Base Address Register (BAR) address register, wherein the second BAR address register stores a correspondence between the first storage address and a virtual address of the second storage address, the second storage address is a nonlinear continuous storage address, and the virtual address of the second storage address is obtained after linear ordering is performed on the second storage address.

4. The data processing system according to claim 1, wherein
the CPU assigns a unique identifier to each PCIe storage device, to identify each PCIe storage device.

5. The data processing system according to claim 4, wherein
the first address information comprises the unique identifier and a logical block address (LBA) of the PCIe storage device.

6. The data processing system according to claim 4, wherein
the management unit is further configured to establish a correspondence between the unique identifier and a base address in a Base Address Register (BAR) of the PCIe storage device.

7. The data processing system according to claim 4, wherein
the unique identifier comprises at least one of a vender identity Vender identifier (ID), a device identity Device ID, and a hard disk serial number; or the unique identifier is an identifier which is obtained after hashing processing is performed on the at least one of the Vender ID, the Device ID, and the hard disk serial number.

8. The data processing system according to claim 5, wherein the management unit comprises a base address obtaining unit and a storage address obtaining unit, wherein
the base address obtaining unit is configured to obtain, when the data processing system receives the data request of the separate data processing system that communicates with the data processing system through the network, a base address in a BAR of the requested data according to a unique identifier that is of the at least one PCIe storage device and is carried in the data request; and
the storage address obtaining unit is configured to obtain the first storage address of the requested data in the at least one PCIe storage device according to the base address in the BAR and an LBA address carried in the first data request.

9. A data processing method, wherein the method is applied to a data processing system comprising a central processing unit (CPU), a memory, a Peripheral Component Interconnect Express (PCIe) controller, a network adapter, and at least one PCIe storage device, and the method comprises:
obtaining, when the data processing system receives a data request, first address information carried in the data request;
obtaining a first storage address of requested data in the at least one PCIe storage device according to the first address information, wherein the first storage address is a memory mapping input/output (MMIO) address; and
directly reading, by the network adapter, data from the at least one PCIe storage device according to the first storage address, and transmitting the data to a separate data processing system, or directly writing the data received from the separate data processing system into the at least one PCIe storage device according to the first storage address, wherein the separate data processing system communicates with the data processing system through a network;
wherein the PCIe controller obtains a second storage address of the data requested by the data request in the at least one PCIe storage device according to the first storage address; the second storage address is a logical address, wherein the logical address is an address which is obtained after linear ordering is performed on a nonlinear continuous physical address.

10. The data processing method according to claim 9, wherein the method further comprises:
configuring, by the PCIe controller, a first Base Address Register (BAR) address register, wherein the first BAR address register stores a correspondence between the first storage address and the second storage address, and the second storage address is a linear continuous storage address.

11. The data processing method according to claim 9, wherein the method further comprises:
configuring, by the PCIe controller, a second Base Address Register (BAR) address register, wherein the second BAR address register stores a correspondence between the first storage address and a virtual address of the second storage address, the second storage address is a nonlinear continuous storage address, and the virtual address of the second storage address is an address which is obtained after linear ordering is performed on the second storage address.

12. The data processing method according to claim 9, wherein the CPU assigns a unique identifier to each PCIe storage device, to identify each PCIe storage device.

13. The data processing system according to claim 12, wherein
the first address information comprises the unique identifier and a logical block address (LBA) of the PCIe storage device.

14. The data processing method according to claim 12, wherein the method further comprises:
establishing a correspondence between the unique identifier and a base address in a Base Address Register (BAR) of the PCIe storage device.

15. The data processing method according to claim 12, wherein the unique identifier comprises at least one of a vender identity Vender identifier (ID), a device identity Device ID, and a hard disk serial number; or the unique identifier is an identifier which is obtained after hashing processing is performed on the at least one of the Vender ID, the Device ID, and the hard disk serial number.

16. The data processing method according to claim 13, wherein the obtaining the first storage address of the requested data in the PCIe storage device comprises:
obtaining a base address in a Base Address Register (BAR) of the requested data according to a unique identifier that is of the at least one PCIe storage device and is carried in the data request; and
obtaining the first storage address of the requested data in the at least one PCIe storage device according to the base address in the BAR and an LBA address carried in the data request.

* * * * *